Jan. 23, 1968     P. N. GUSTAFSON     3,364,955
CORE FOR PRESSURE-SENSITIVE ADHESIVE TAPE
Original Filed March 26, 1962
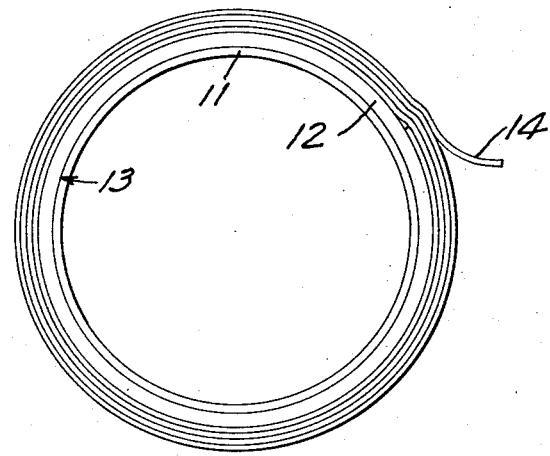
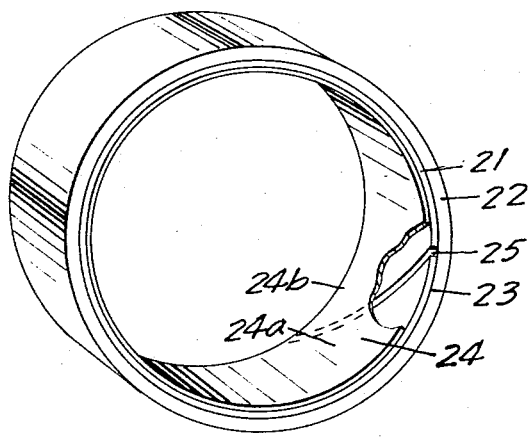
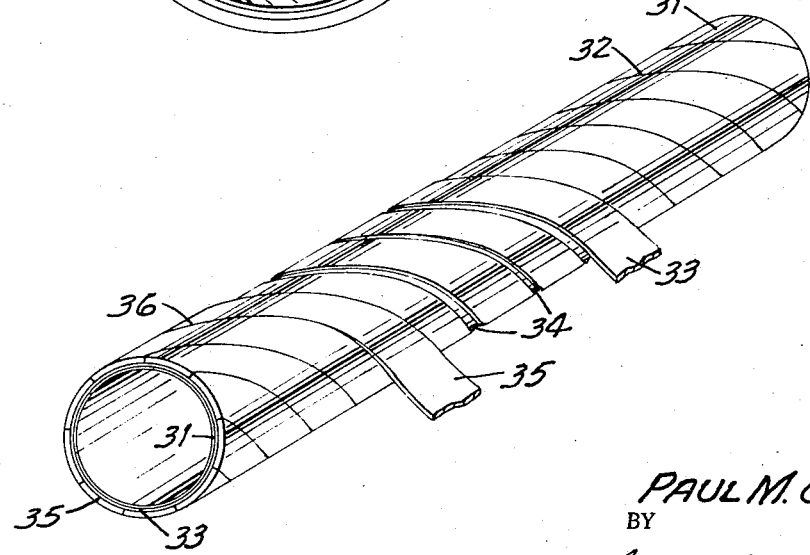
INVENTOR.
PAUL M. GUSTAFSON
BY
Carpenter, Kinney & Coulter
ATTORNEYS United States Patent Office 3,364,955
Patented Jan. 23, 1968

3,364,955
CORE FOR PRESSURE-SENSITIVE
ADHESIVE TAPE
Paul N. Gustafson, St. Paul, Minn., assignor to Minnesota Mining and Manufacturing Company, St. Paul, Minn., a corporation of Delaware
Original application Mar. 26, 1962, Ser. No. 182,240, now Patent No. 3,204,763, dated Sept. 7, 1965. Divided and this application Feb. 24, 1965, Ser. No. 448,223
2 Claims. (Cl. 138—144)

ABSTRACT OF THE DISCLOSURE

A composite core for a convolutely wound roll of sheet material, such as pressure-sensitive adhesive tape, is made up of concentric annuli. When the sheet material is withdrawn from the roll and the inner annulus is held in fixed position, the outer annulus rotates upon the inner. The core may be made by slicing a composite tube formed from a plurality of spirally wound plies in which the interface between two plies is free of adhesive. A ply radially inward from the interface may be wound to leave a gap between adjacent edges, facilitating separation of annuli, if desired.

---

This application is a division of copending application Ser. No. 182,240, now U.S. Patent 3,204,763.

Cores for pressure-sensitive adhesive tape are usually made from bulky inexpensive materials which provide a desired degree of stiffness at minimum cost. A typical manufacturing procedure involves forming a tube by spirally or helically winding seven or more plies of chipboard, jute paper, or the like, on a cylindrical mandrel to a thickness of perhaps 1/8″, an inexpensive adhesive, such as precooked dextrine dissolved in water, being used to bond the plies together. The tube is then slit, or sliced, at right angles to its axis to form tape cores of the desired width, the inner edges of the core being raised and roughened to some extent by the slitting operation. A common inner core diameter for industrial tape is three inches.

In many industrial operations the uses of a roll of pressure-sensitive adhesive tape holds the core in one hand, affixes one end of the tape to a surface to be masked or taped and then pulls vigorously on the roll of tape to quickly withdraw a suitable length thereof. In this operation, the tape core slides on the user's hand, and the rough inner surface and somewhat abrasive edges tend to burn or scratch the skin with which they come in contact. This source of irritation is a limiting factor governing the speed with which some taping operations are performed. Attempts have been made to minimize the problem of friction and abrasion of the user's hand by developing small dispensers which fit inside the tape core and provide a bearing surface against which the core rotates. Such dispensers have not been widely used, however, because of their cost, particularly since many of them are likely to be lost or broken in use. In addition, most such dispensers can be used with only one width of tape.

I have now devised an inexpensive but highly convenient tape core which can be held in the hand of the user, the rapid withdrawing of tape causing no injury to the user's hand. My novel tape cores are simple and easy to fabricate, providing an inexpensive and highly effective solution to a problem of long standing.

In accordance with my invention I form a composite annular tape core from two rotatably slidably contacting concentric annular members instead of the single annulus customarily employed. By this simple but unobvious means I provide a tape core which the user can hold, his fingers contacting the inner annulus and holding it in fixed position while the outer annulus revolves as tape is withdrawn. If desired, a roll of tape wound on such a core may be mounted on a dispenser and used in the same manner as tape wound on a conventional core, thus providing an unusual degree of versatility.

My invention will be better understood upon reference to the accompanying drawings, in which:

FIGURE 1 is a side view of one embodiment of my novel tape core, showing a roll of normally tacky and pressure-sensitive adhesive tape wound thereon;

FIGURE 2 is a view in perspective of a preferred embodiment of my invention, with certain portions being shown partially cut away for greater clarity; and FIGURE 3 is a view in perspective of a tube, in process of manufacture, from which the core shown in FIGURE 2 can be sliced.

With reference to FIGURE 1, inner annulus 11 is snugly positioned inside outer annulus 12, contacting it along interface 13. An elongate strip of normally tacky pressure-sensitive adhesive tape 14 is convolutely wound upon itself on the outer circumference of annulus 12. A tape core of this type may be formed by only slightly modifying the conventional manufacturing process described in the second paragraph of this disclosure to provide two concentric annuli instead of the conventional one. This result may be accomplished by either omitting the adhesive between two radially adjacent plies or replacing the adhesive with an oil or other material repellent to the water-based core adhesive used to unite the other plies, e.g., silicone resin, a Werner-type chromium complex, or the like. As a further aid to insure the free rotation of annulus 12 about annulus 11, it may be desirable to form one of the two plies which contact to form interface 13 from a sheet material having a comparatively smooth surface, e.g., calendered parchment, plastic coated paper, or the like.

Free rotation of the outer annulus about the inner may also be aided by increasing the degree of clearance between the two in various ways. For example, the inner annulus may be made of a shrinkable material, e.g., a wet bulky ply which will contract to a greater degree upon drying than will the outer plies. The inner annulus may also be formed from an elastic material which is stretched slightly when it is wound about the forming mandrel, the relaxation which occurs when the tube is removed from the mandrel providing circumferential shrinkage of the inner annulus. It might be supposed that such an increase in the space between the two annuli would cause the ultimately formed composite cores to fall apart by axial separation, either before or during use. As a matter of practice, however, such is not the case; the operation which slits the tubes into composite cores made according to my invention serves to produce an edge on the outer annulus which is turned radially inward enough to hold the inner annulus in position.

The embodiment of my invention shown in FIGURE 2 illustrates a tape core which is especially well suited for use either in conventional dispensers or in hand operations of the type previously described. Split ring annulus 21 is snugly positioned inside outer annulus 22, the radially outer surface of the former and the radially inner surface of the latter contacting at interface 23. If desired, a strip of sheet material 24, which may bear identifying indicia for tape wound on the core, is firmly adhered to the radially inner surface of split ring annulus 21 so as to span gap 25, areas 24a and 24b indicating the portions of strip 24 located immediately adajcent to and on opposite sides of gap 25. Structurally, strip 24 need be only wide enough to slightly more than span gap 25 and may be adhered to either the radially inner or radially outer surface of split ring annulus 21; in fact, strip 24 may be wound to adhere to the radially inner part of one end of split ring annulus 21 and to the radially outer surface of the other end. Adhesion of strip 24 to annulus 21 may be low enough to permit its removal if desired. Any of the various means described in connection with FIGURE 1 may be employed to minimize friction at interface 23.

A roll of tape in which an elongate strip of normally tacky and pressure-sensitive adhesive tape is wound on the core shown in FIGURE 2 may, if desired, be used in the same manner as a conventional roll of tape. Thus it may be firmly mounted on the expandable mandrel of a slitter or on a dispenser drum, the expanding action provided by the mandrel or drum serving to force split ring annulus 21 into such firm contact with outer annulus 22 that no slipping occurs at interface 23, rotation instead occurring about the axis of the mandrel or drum. If it is desired, however, to use the roll of tape for a hand operation, the core may be readily and simply converted to adapt it for such use. The operator wishing to so employ the tape performs the following steps: (1) with his fingernail or the back of a knife blade he depresses paper ply 24 into gap 25, and (2) gripping the roll of tape in both hands while placing one thumb at area 24a and the other at area 24b, he forces his thumbs toward each other at right angles to gap 25. This simple and quickly performed operation decreases the circumference of annulus 21 to permit ready rotation of outer annulus 22 about inner annulus 21. To make the two annuli freely rotatable as just indicated, gap 25 may be on the order of $1/16$–$1/8''$ in width.

The core of FIGURE 2 is conveniently slit from a tube formed by the process indicated in FIGURE 3, in which strip 31, ply 33, and ply 35 are successively wound about a cylindrical forming mandrel (not shown). Strip 31 may be wound so that its lateral edges contact smoothly at line of abutment 32, but ply 33 is wound so that a gap 34 is deliberately left between adjacent lateral edges, this gap occurring over strip 31. Strip 31 and ply 33 are adhesively secured together; adhesive is omitted between ply 35 and ply 33 to decrease frictional engagement, the winding, however, being snug enough to prevent premature slipping. Ply 35 is preferably wound in such a manner that its lateral edges abut snugly along line 36. Succeeding plies are wounded over each other in the same manner as ply 35 and adhesively secured to the underlying plies.

The total number of plies employed is dependent upon the dimensions, stiffness, and strength of the individual plies, as well as upon the overall dimensions and ultimate use of the core. I have found that where my composite core is formed from seven plies of approximately equal thickness, the interface between the inner and outer annuli should generally occur between either the second and third or the third and fourth plies from the center of the core, counting any substantially contiguous innermost indicia-bearing strip as the first ply. In order to assure free rotation of the outer annulus about the inner, the outer annulus should be sufficiently thick to keep it from collapsing during the operation in which adhesive tape is wound thereon. The inner annulus must only be thick and strong enough not to collapse, tear, or abrade away from the pressures exerted by an operator in normal use. Although additional thickness does not appear to be especially harmful, it tends to detract from the economy of the core construction.

Many modifications and adaptations of my invention will be apparent to those skilled in the art. For example, sheet material other than pressure-sensitive adhesive tape, such as paper toweling, ribbon, tissue paper, and similar sheet material either sold in roll form for manual handling or mounted on a dispenser having a fixed core holder, may advantageously be wound on the novel core of this invention. Accordingly, patent protection is limited only by the scope of the appended claims.

What I claim is:

1. A composite tube formed from a plurality of successively snugly spirally wound adhesively united individual plies, the interface between two of said plies being free from adhesive so as to provide an outer and an inner annulus, and a ply lying radially inward from said interface being wound so as to leave a substantial gap between adjacent lateral edges, whereby cores for sheet material such as pressure-sensitive adhesive tape may be formed by cutting said tube to appropriate lengths, the annuli of such cores being capable, when a roll of sheet material wound thereon is unwound, of either rotating as a unit or, when the lateral edges of the radially inward ply are forced together to increase the separation between annuli, rotating separately.

2. The tube of claim 1 in which, radially inwardly adjacent to said ply having a gap between adjacent lateral edges, is adhered a ply which covers said gap.

References Cited
UNITED STATES PATENTS

| | | | |
|---|---|---|---|
| 2,350,369 | 6/1944 | Sampair | 206—59 |
| 2,659,543 | 11/1953 | Guyer | 242—68.5 |
| 2,888,043 | 5/1959 | Reid | 138—144 |

LAVERNE D. GEIGER, *Primary Examiner.*

T. MOORHEAD, BRADFORD KILE,
*Assistant Examiners.*